Jan. 14, 1930.  J. J. MORRIS  1,743,862
MULTIPLE SPINDLE ROTARY TURNING MACHINE
Filed Sept. 17, 1927  5 Sheets-Sheet 1

Inventor
James J. Morris
By Wilson & McCann
Attys

Jan. 14, 1930. J. J. MORRIS 1,743,862
MULTIPLE SPINDLE ROTARY TURNING MACHINE
Filed Sept. 17, 1927   5 Sheets-Sheet 3 fig 5 fig 6

Inventor
James J Morris
By
Wilson & McCanna
Attys

Jan. 14, 1930.  J. J. MORRIS  1,743,862
MULTIPLE SPINDLE ROTARY TURNING MACHINE
Filed Sept. 17, 1927  5 Sheets-Sheet 4

Inventor
James J. Morris
By Wilson & McCanna
Attys

Jan. 14, 1930.  J. J. MORRIS  1,743,862
MULTIPLE SPINDLE ROTARY TURNING MACHINE
Filed Sept. 17, 1927  5 Sheets-Sheet 5 fig 9 fig 10 fig 11

Tools begin feed
Start Rapid Approach

Inventor
James J. Morris
By
Wilson & McCanna
Attys

Patented Jan. 14, 1930

1,743,862

UNITED STATES PATENT OFFICE

JAMES J. MORRIS, OF ROCKFORD, ILLINOIS

MULTIPLE-SPINDLE ROTARY TURNING MACHINE

Application filed September 17, 1927. Serial No. 220,073.

This invention relates to an automatic multiple spindle rotary turning machine and has for its principal object the provision of a machine of this type designed with a special view to greatly increased production and general adaptability to work requiring turning operations, as in the case of the machining of clutch plate centers, clutch pressure plates, pistons, universal joint companion flanges, gear blanks, wheel hubs, and the like.

In the machine of my invention I provide a continuously revolving turntable carrying a plurality of circumferentially spaced work holding spindles arranged to be driven during the turning of the table, and work carriages mounted on the turntable adjacent the the spindles and arranged to have movement with respect thereto to feed the tools to the work to perform the desired operations thereon as, for example, facing the same and turning the same down to a given diameter or any variations of these ordinary turning operations. The work pieces are arranged to be placed on the spindles and the finished pieces removed between two points in the course of the turning of the table past the operator's position. Thus, the only possible limitation on the production of the machine is the time element involved in the substitution of the unfinished pieces for the finished ones. In other words, the shorter the idle travel of the spindles may be made the greater will be the production secured. It will also be evident that the making of the machine on a larger or smaller scale will adapt the same to operating on work of proportionately larger or smaller dimensions. The kinds of work above enumerated should not, therefore, be regarded particularly as a limitation on the adaptability of the invention, as the requirements for work of larger dimensions than the kind referred to would be met by a larger sized machine. It is also contemplated that by slight variation in the design of the present machine the invention would also be applicable to certain types of drilling, boring, reaming or tapping operations by substitution and proper placement of the necessary tools in place of the turning tools herein provided.

Among the structural features of the machine of my invention may be mentioned—

(1) The provision of simple cams for transmitting the vertical and cross feeds to the two sets of tool carriages whereby the turning operations are commenced at one end of the cycle and are continued through the cycle to the end thereof when the tools are allowed to be retracted during the travel of the spindles past the operator's position where the finished pieces are removed and unfinished ones are placed on the spindles;

(2) The provision of a simple cam for disconnecting the drives for the spindles in succession as they arrive at the operator's position in order that the substitution of the unfinished for the finished pieces may be made;

(3) The provision of chucks on the spindles for gripping the work pieces thereon, and a simple cam arranged for operating the chucks in succession as they arrive at the end of the cycle of movement so that the work pieces are released and may be removed, and for again operating the chucks as they are about to leave the operator's position at the beginning of the operating cycle so as to grip the work pieces which have just been placed on the spindles; and (4) The provision of a cutting fluid distributor turning with the turntable and having delivery openings leading to the various work holding spindles to supply the cutting fluid onto the work during the turning operations, the said distributor having valves controlling the passage of the fluid through the openings, which valves are arranged to be closed in succession as the openings come into position where they are directed toward the operator's position so as to shut off the discharge of the cutting fluid during the removal and the placing of the work pieces on the spindles.

The foregoing and other novel features incorporated in the machine of my invention will be described in detail in the following specification in which reference is made to the accompanying drawings wherein—

The same reference numerals are applied to corresponding parts throughout the views.

Figure 1:
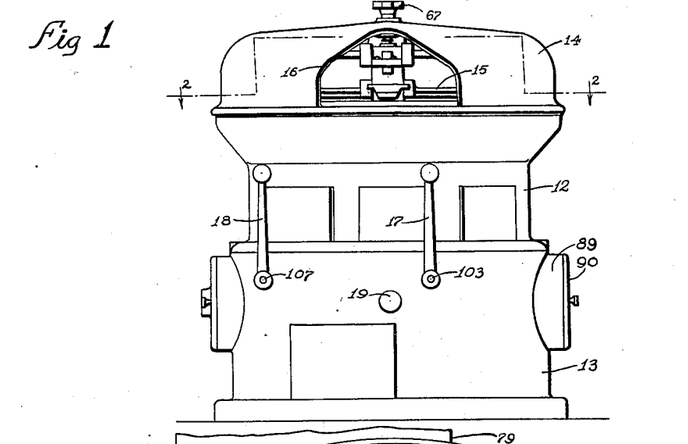
Figure 1 is a front view on a reduced scale of a machine or mill built in accordance with my invention.

The machine of my invention, as will be observed from the front view shown in Fig. 1, presents a neat appearance. All of the operating mechanism is encased within the base housings 12 and 13, and a hood 14 encloses the turntable or rotor 15. The latter is visible through the opening 16 provided in the hood at the operator's position. It is through this opening that the finished work is removed and new work placed in the machine. Handily located with reference to the operator's position is a main clutch lever 17, an auxiliary clutch lever 18 and a safety release button 19 operable by knee pressure or otherwise. These constitute the entire set of controls. The turntable 15 has a number of work holding spindles 20 mounted thereon in circumferentially spaced relation for holding and driving work pieces, such as those shown at 21 in Fig. 2 and in dotted lines in Fig. 3, the work represented being clutch plate centers. This type of work necessitates tools fed horizontally for facing both sides of the piece to provide a flange for fastening a clutch plate thereon and also involves the turning down of the piece to a certain prescribed diameter which requires the use of tools fed vertically. The horizontally reciprocating tool holders are shown at 22 and the vertically reciprocating tool holders are shown at 23. For the purpose of conveying a general understanding of the machine it may be stated at this point that the table 15 turns continuously in the operation of the machine and the work holding spindles 20 are driven at all times except when they are passing the operator's position. Thus, the work is spinning in relation to the tools throughout the operating part of each cycle of turning of the table and, when the spindles are idle as they pass the operator's station, one after another, the finished pieces may be removed and new ones substituted. The tool holders 22 and 23 are fed crosswise and vertically, respectively, progressively from the beginning of the operating part of the cycle of turning of the table to the end thereof. The progress of the tools is evident in Fig. 2 wherein the work pieces 21 on the various spindles are shown in different stages of completion accordingly as they are advanced more or less through the course of the operating part of the cycle of turning of the table. Thus, at the point designated $a$, the facing tools 24 in the holders 22 are just about to commence the cross feed to face the top and bottom sides of the piece and the tool 25 in the holder 23 is just about to commence the vertical feed for the turning down of the piece to the prescribed diameter. At the next point advanced, designated $b$, the progress of the cross feed and vertical feed will be evident, and so on through points still further advanced, as $c$, $d$ and $e$. At point $f$ the vertical and cross feeds are evidently completed and the piece is finished and ready for removal from the machine. In the travel of the table from the point $f$ to the point $a$ the finished piece is removed from the spindle by the operator through the opening 16 and another piece is substituted therefor. While the operator is doing this there are, of course, five other pieces in the course of being finished in the machine. The particular number of spindles used is, of course, unimportant as any number greater or less than six might be employed. In any case there would always be a number of work pieces one less than the total number of spindles in the machine which would be in the course of being finished at any time when the operator is removing a finished piece and replacing the same with another. As stated before, the spindles are idle as they arrive one after the other at the operator's position to permit the removal of the pieces and the substitution of others. It will also be evident that it is necessary to have the tools retracted from the work to permit the removal of the finished piece and the replacement of another. Provision is made for this, as will be described presently. The operator has the entire machine under his control with the lever 17, the shifting of which stops the turning of the table and the driving of the spindles. Further reference to this lever will be made hereinafter. If, at any time, the operator desires to stop the turntable alone he may do so by pressing the release button 19. This button, as will hereinafter appear, is so related to the lever 18 that pressure thereon instantly releases the clutch controlling the driving of the turntable, and after this clutch has been released it may be reengaged by shifting the lever 18, the shifting of the lever to engage the clutch serving also to cock the button 19 for the next release of the clutch. The operator might, for example, in his hasty removal of a finished piece and the placing of another piece in the machine fail at one time or another, to get the piece placed properly. In that case if the turntable continued its travel a jam would result. Hence, the necessity for providing for the instantaneous stopping of the turntable at any time. The quick release is, furthermore, a practical necessity for the reason that the machine is usually sped up to such an extent that the idle period at the operator's position is just long enough to enable an operator to take out finished pieces and substitute others.

Figure 2:
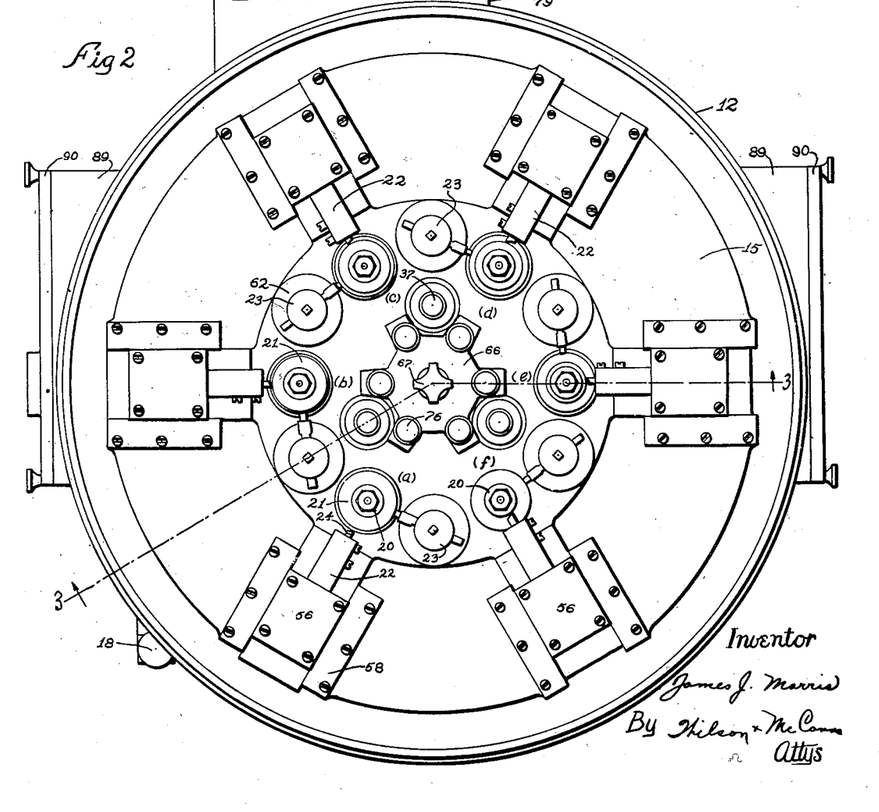
Fig. 2 is a plan view of Fig. 1 with the hood removed so that the parts are seen approximately on the line 2—2 of Fig. 1.
Figures 3, 4:
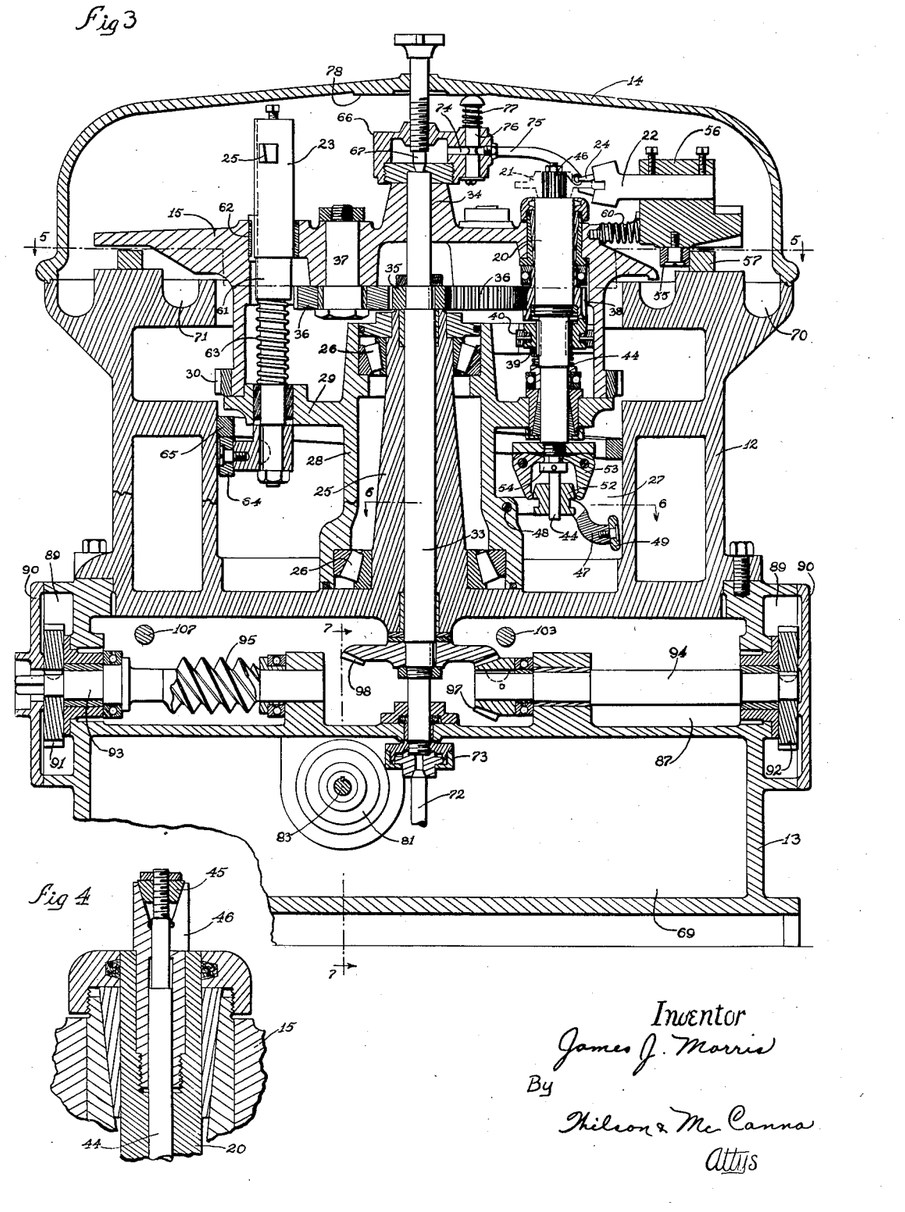
Fig. 3 is, in the main, a central vertical section through Fig. 2 with the upper half of the section taken looking on the broken line 3—3 of Fig. 2.
Fig. 4 is an enlarged sectional detail of the chuck end of a work holding spindle, one of which appears in Fig. 3.
Figure 5:
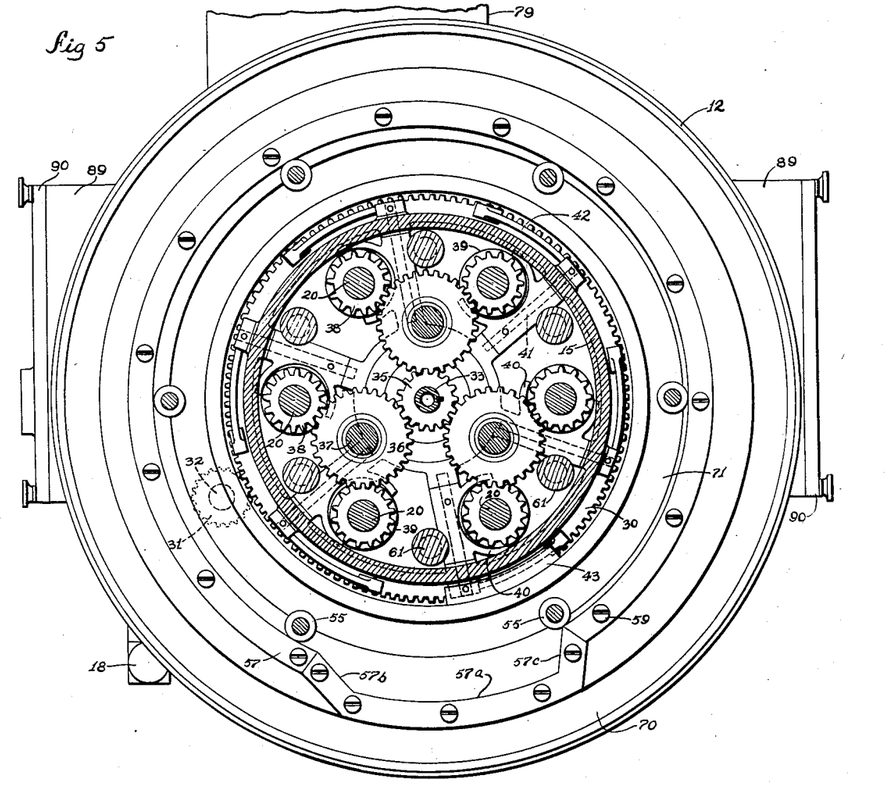
Fig. 5 is a horizontal section on the broken line 5—5 of Fig. 3.
Figure 6:
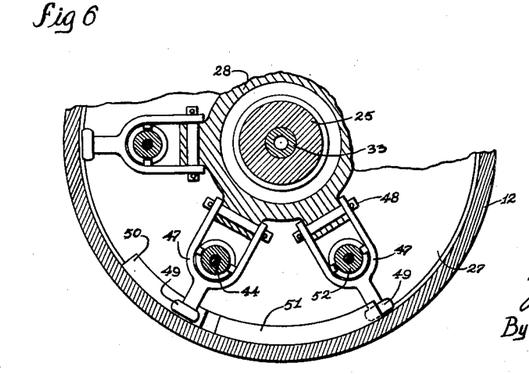
Fig. 6 is a horizontal sectional detail on the line 6—6 of Fig. 3.
Figure 11:
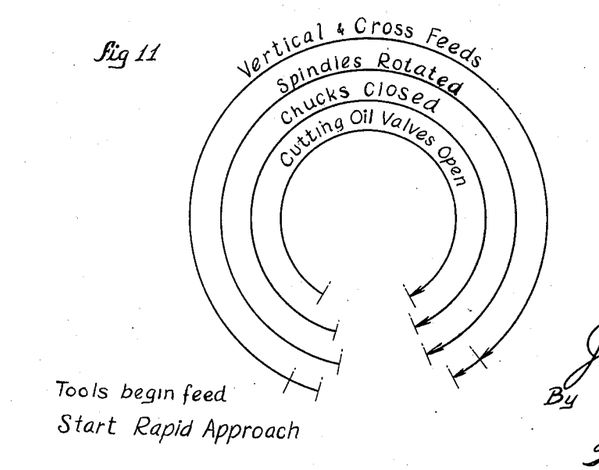
Fig. 11 is an operating diagram for the machine.

The turntable 15, as most clearly appears in Fig. 3, is centrally mounted in the upper base housing 12 on a standard 25, roller bearings 26 being provided for smooth and easy running. The housing 12 is drum-shaped to provide an annular recess 27 therein about the standard 25 for the reception of the hub 28 of the turntable. The latter, it will be observed, is in the nature of a pedestal formed in a separate casting from the turntable proper, which rests upon and is suitably secured to a flange 29 provided on the hub and projecting radially therefrom. The turntable proper projects over the top of the housing 12, as clearly indicated. A ring gear 30 is fixed on a depending portion of the table 15 and meshes with a pinion 31 fixed on an upright shaft 32 which extends downwardly into the lower base housing 13. The means for driving the shaft 32 will be presently described. It will suffice to state here that the shaft 32 is normally driven continuously in the operation of the machine to communicate continuous rotation to the turntable. A tubular shaft 33, the driving connections for which will also be described presently, is also arranged normally to be driven continuously and extends upwardly centrally through the standard 25 and beyond the upper end thereof through the turntable 15, as indicated at 34. A gear 35 is keyed on the shaft 33 beneath the turntable 15 and is the central gear of a gear cluster consisting of three intermediate gears 36 on studs 37 and six outer driven gears 38 mounted on the spindles 20, there being two gears of the six meshing with each of the three intermediate gears 36, as appears in Fig. 5. The gears 38 are free to turn on the spindles 20 except when clutched by clutch collars 39. The latter, as appears in Fig. 3, are splined on the spindles 20 and arranged to be shifted by yokes 40. The yokes 40, as appears in Fig. 5, are mounted on rods 41 arranged to be oscillated by arms 42, the free ends of which at a certain point in the travel of the turntable engage a cam projection 43 provided within the annular recess 27 on the housing 12. When the levers 42 come into engagement with the cam 43 the collars 39 are forced downwardly against the action of compression springs 44. Thus the spindles associated with the levers are disconnected from driving relation to the gears 38. As soon as one of the levers 42 passes the cam 43, the spring 44 for the spindle associated with the lever reengages the clutch 39, so that the spindle is again turned with its gear 38. The cam 43 is provided of such length that the spindles are idle during the course of their travel past the operator's position, that is, between the points $f$ and $a$ indicated in Fig. 2. The idle period of the spindles is also indicated by the blank portion of the diagram in Fig. 11. The spindles 20, as indicated in Fig. 4, are hollow and each has a stem 44 extending therethrough provided with a wedge 45 on the upper end thereof to serve in the spreading of the jaws of a chuck 46 after the manner of chucks employed in automatic screw machines. Of course, any type of means for gripping the work might be employed. The upward movement of the stem 44 serves to release the work and the downward movement to grip the work in a manner believed to be self-evident. The up and down movement of each stem 44 is secured by oscillation of an arm 47 pivoted to the hub 28 of the turntable 15, as indicated at 48. These arms 47 have rollers 49 on the outer ends thereof arranged to ride on top of a cam projection 50 or beneath a cam projection 51, the former serving to raise the arms 47 and the latter to lower the same. In the raising of the arms 47, the collars 52 cause the bell crank levers 53 to bear downwardly on the collars 54 fixed on the stems 44, thus spreading the jaws of the chucks 46 to grip the work pieces in a well known manner. The cam 50 which serves this purpose is so disposed that the chucks are closed shortly after the spindles have commenced to rotate after they leave the operator's position, as will be observed from the diagram in Fig. 11. The cam 51, on the other hand, which serves to lower the arms 47 as they come beneath the cam one by one in the turning of the table 15, is so disposed with relation to the travel of the table that the chucks are opened at substantially the same instant that the spindles stop rotating upon their arrival at the operator's position. This is also evident from the aforesaid diagram. Obviously, then, as the spindles pass by the operator's position they are not being rotated nor are the chucks thereof gripping the work pieces, but the moment the spindles have passed the operator's position they are thrown back into operation and, almost coincident with this, the chucks on the spindles grip the work for the machining operation. By having the clutch for driving the spindles engaged slightly in advance of the gripping of the work by the chuck, there is greater assurance that the work will be setting squarely on the spindle at the time the chuck grips the same.

In the course of the clockwise travel of the turntable from the point designated $a$ in Fig. 2 to the point designated $f$, the tool holders 22 are fed progressively inwardly. This will be best understood by observation of Fig. 5 wherein the rollers 55 associated with the tool carriages 56 of the tool holders 22 are shown in engagement with a continuous annular cam 57. The tool carriages 56 are reciprocable in ways 58 provided on the turntable 15 and have the rollers 55 mounted on the under side thereof and arranged to travel along the inside of the cam 57, the latter being fixed on top of the upper base housing 12, as by means of screws 59. Springs 60 acting between abutments on the turntable 15 and the carriages 56 normally urge the latter outwardly tending to retract the tools 24 from the work, and the rollers 55 are thus maintained in contact with the cam. When the tool carriages 56 arrive at the point $f$, above referred to, the rollers 55 ride out into an offset portion 57$^a$ of the cam 57. The portions 57$^b$ and 57$^c$ provide, respectively, for a rapid approach of the tools from the retracted position to the work and a rapid return of the tools from the work to the retracted position. The tools are, therefore, in a retracted position during the travel of the spindles past the operator's position, thus making it a simple matter for the operator to remove the finished pieces from the spindles and to replace them with new ones. The points above referred to are illustrated in the diagram appearing in Fig. 11. In a similar manner the tool holders 23 carrying the tools 25 are given a vertical feed progressively in the travel of the turntable clockwise from the point $a$ to the point $f$. These tool holders are mounted on vertically reciprocable carriages 61 splined in bearings 62 in the turntable 15 so that the carriages reciprocate but cannot be turned out of proper position. The springs 63 serve normally to hold the carriages elevated with the rollers 64 in contact with the continuous annular cam 65 mounted within the recess 27 of the upper base housing 12. At the end of the turning operation, as indicated in the diagram in Fig. 11, the carriages 61 make a rapid return from their position of lowest elevation to their position of highest elevation. The tools 25 are, therefore, in a retracted position as the spindles pass the operator's position. The single carriage 61 appearing in Fig. 3 is indicated at a position corresponding approximately to the highest degree of elevation.

Cutting oil is supplied to the tools at the various spindles from a distributor 66 mounted centrally on top of the turntable 15 to turn therewith. The distributor communicates with the upper end of the hollow shaft 33 through a needle valve 67. The cutting oil is supplied under pressure through the shaft 33 from a pump 68 mounted in a chamber 69 provided in the lower base housing 13, wherein a sufficient amount of cutting oil is provided so that the pump can deliver the oil in sufficient volume at all times to the operating spindles. Suitable provision is made for the drainage of the oil from the annular gutters 70 and 71 back to the chamber 69. A connection is made between the shaft 33 and the pump 68 through a pipe 72 and coupling 73. The setting of the needle valve 67 obviously determines the amount of cutting oil discharged through the various delivery openings 74, which lead to the operating spindles by way of tubes 75 mounted on the distributor and communicating with the openings 74. These tubes are not shown in Fig. 2 in order to avoid obliterating other more important features therein shown. The valve 67 may be adjusted from above the hood 14. A plurality of plunger valves 76 are provided in the distributor 66 controlling the passage of the oil through the openings 74. The springs 77 serve normally to hold the valves open and the valves have the round heads thereof riding in contact with a cam surface 78 provided on the under side of the hood 14. This cam surface has a projection whereby the plungers 76 are depressed throughout that portion of the travel of the turntable when the spindles are moving past the operator's position. In other words, the discharge of cutting oil is shut off whenever the openings 74 are directed toward the opening 16 in the hood 14. There is, therefore, no danger of a discharge of cutting oil onto the operator.

Figure 7:
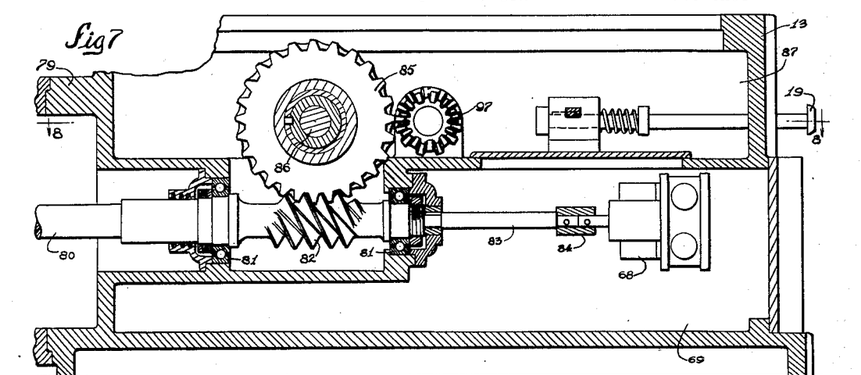
Fig. 7 is a vertical sectional detail through the lower portion of the base of the machine on the line 7—7 of Fig. 3.
Figure 8:
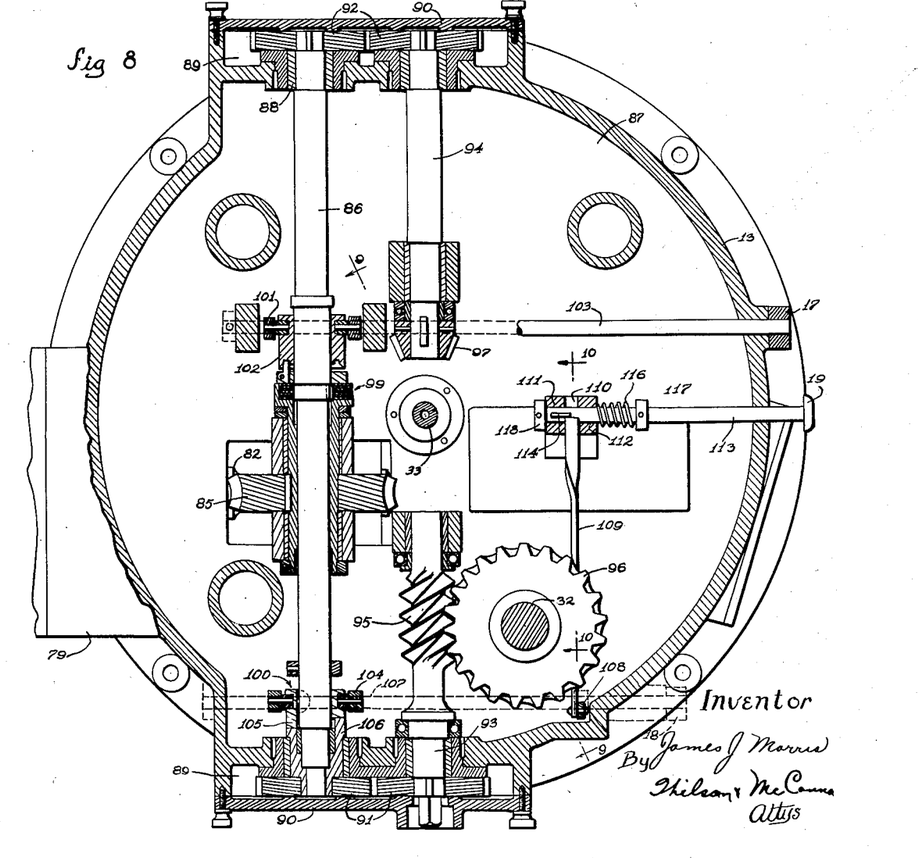
Fig. 8 is a horizontal section on the line 8—8 of Fig. 7.
Figure 9:
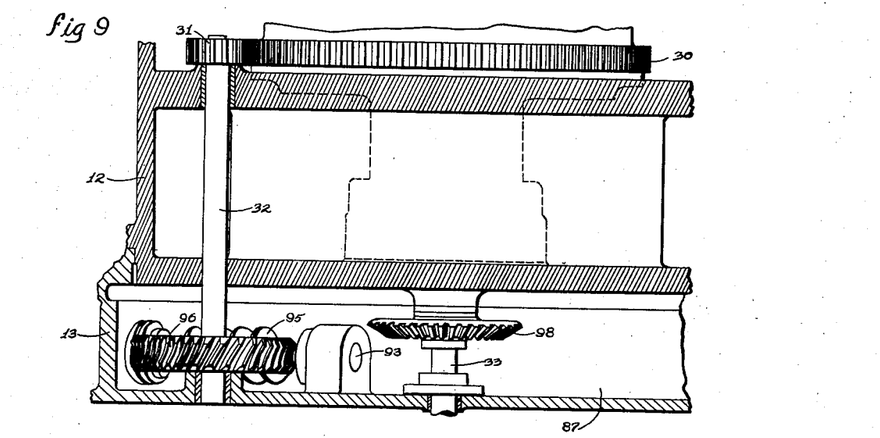
Figs. 9 and 10 are vertical sectional details on the lines 9—9 and 10—10 of Fig. 8.
Figure 10:
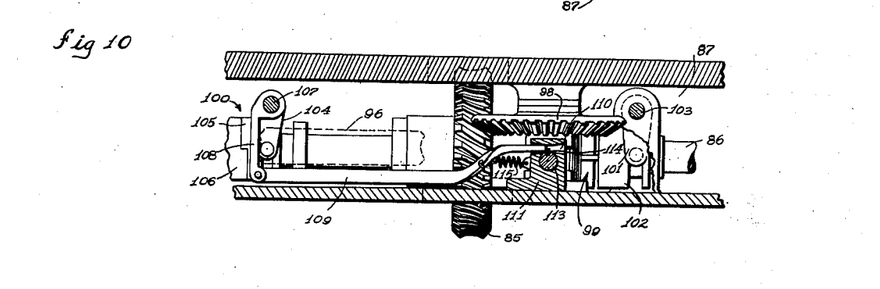

Power is supplied to the machine suitably by an electric motor, the housing of which may be mounted directly on an extension of the lower base housing 13 indicated at 79. The power shaft appears at 80 in Fig. 7 and is received in bearings 81 provided in the lower base housing 13. A worm 82 turns with the shaft 80 between the bearings 81, and an extension 83 of the shaft 80 has a direct connection with the pump 68 through a a suitable coupling 84. The worm 82 meshes with a worm gear 85 normally free to turn on a shaft 86 extending crosswise in the upper chamber 87 of the lower base housing 13. The shaft 86 is journaled in bearings 88 in the side walls of the housing 13 and the two ends of the shaft project into recesses 89 which are cast in the wall of the housing 13 at the opposite sides thereof and closed by removable cover plates 90. Two pairs of changeable pick-off gears 91 and 92 are housed in the recesses 89 providing driving connections between the ends of the shaft 86 and two shafts 93 and 94, respectively. The former turns a worm 95 meshing with a worm gear 96 fixed on the lower end of the upright shaft 32. Thus the drive for the turntable originating at the power shaft 80 is evidently as follows: worm 82 to worm gear 85 and, provided the shaft 86 is driven with the gear 85 as will presently appear, through the pick-off gears 91 to shaft 93 (provided also that the pick-off gears 91 are driven from the shaft 86 as will also presently appear), from worm 95 to worm gear 96, and finally from pinion 31 to ring gear 30. The shaft 94, on the other hand, carries a bevel pinion 97 meshing with a bevel gear 98 keyed on the lower end of the upright tubular shaft 33, above referred to. Thus, the drive for the spindles 20 is completed as follows: from the power shaft 80 through worm 82 and worm gear 85 to shaft 86 (through a clutch presently to be referred to), through pick-off gears 92 to shaft 94, from bevel pinion 97 to bevel gear 98 and finally from the central gear 35 of the gear cluster through the intermediate gears 36 to the gears 38 of the driven spindles 20. Two clutches, one a main clutch, designated 99, and the other an auxiliary clutch, designated 100, serve to control the operation of the machine in the manner first above described, the main clutch 99 being under the control of the lever 17 and the auxiliary clutch 100 being under the control of the lever 18 and release button 19. The clutch 99 is illustrated as of the friction disk type and serves to connect the worm gear 85 with the shaft 86 in a manner believed to be self evident from the showing thereof in Fig. 8. A yoke 101 is arranged to shift the collar 102 when the shaft 103 is oscillated by the lever 17. When power is transmitted to the shaft 86, provided the clutch 100 has been engaged, the turntable will be revolved and the spindles will likewise be driven. Thus the operator can stop the machine by simply shifting the lever 17. A different set of controls, however, is provided for the clutch 100. The latter has a yoke 104 for shifting the collar 105 into or out of clutching engagement with a hub 106, mounted freely on the end of the shaft 86 and having one of the pair of pick-off gears 91 fixed thereon. A shaft 107, on which the lever 18 is mounted, serves to oscillate the yoke 104. The shaft 107 also has an arm 108 attached thereto to which is connected a link 109, the free end of which is received in an opening 110 provided in a bearing block 111 mounted within the chamber 87 of the base housing 13. The block 111 has an opening 112 extending therethrough crosswise in relation to the opening 110. A rod 113, which carries the release button 19, passes through the opening 112 and has a key 114 thereon which normally projects slightly into the opening 110 and serves as an abutment or stop for the end of the link 109. The end of the latter is urged inwardly toward engagement with the key 114 under the action of a coiled tension spring 115, fixed to the link 109 at one end and at the other end suitably to the block 111 (see Fig. 10). The key 114 is kept in the locking position illustrated in Fig. 8 under the action of a coiled compression spring 116, mounted on the rod 113 between the bearing block 111 and a collar 117 fixed on the rod. The inner end of the rod 113 carries another collar 118 limiting the movement of the latter under the action of the spring 116. It will be apparent that pressure on the button 19 will serve to move the rod 113 against the action of the spring 116 so that the key 114 will be moved out of the way to permit the link 109 to move in the opening 110 under the action of its spring 115, thus throwing the arm 108 in such direction that the clutch 100 is disengaged. The release of the clutch is, of course, practically instantaneous and much more rapid than could possibly be produced by ordinary manual operation. As a matter of fact, the operator need merely kick the button with his knee to cause the release of the clutch. The moment the clutch 100 is disengaged the turntable 15 is stopped. The operator then has an opportunity to make whatever adjustment he desires in the matter of placing of work pieces or the removal thereof and is then free to throw the turntable back into operation by simply shifting the lever 18. When the latter is shifted to reengage the clutch 100 it will be obvious that the link 109 is moved back to the position shown in Fig. 8, whereupon the release button 19 will be cocked under the action of the spring 116 for a subsequent release.

It is believed that the foregoing description conveys a sufficiently clear understanding of the invention and of its purposes and advantages so that anyone skilled in the art to which the invention relates will readily appreciate all of its possible applications. While the invention has been described in connection with one particular embodiment, it should be understood, as stated before, that the same is capable of considerable modification and adaptation within the spirit and scope of the invention as defined by the appended claims, in which—

I claim:

1. In a machine of the character described, the combination of a turntable, a plurality of circumferentially arranged spindles mounted thereon, said spindles being arranged to receive work pieces thereon to be machined, means for driving the spindles, means for turning the table, tool carriages mounted on the table for movement relative to the work pieces carried by the spindles, a frame, means disposed directly beneath the turntable and having direct connections with said carriages for communicating movement thereto during the turning of the table, clutches for said spindles for detachably connecting the same with their driving means, means for disengaging the clutches for the spindles in succession at a certain point in the cycle of turning of the table, the said clutches being reengaged at another point in the cycle of turning of the table, chucks on said spindles for detachably holding the work pieces, and means for opening the chucks in timed relation to the operation of the clutches.

2. In a machine of the character described, the combination of a turntable, a plurality of circumferentially arranged spindles mounted thereon, said spindles being arranged to receive work pieces thereon to be machined, means for driving the spindles, means for turning the table, tool carriages mounted on the table for movement relative to the work pieces carried by the spindles, a frame, means disposed directly beneath the turntable and having direct connections with said carriages for communicating movement thereto during the turning of the table, clutches for said spindles for detachably connecting the same with their driving means, means for disengaging the clutches for the spindles in succession at a certain point in the cycle of turning of the table, the said clutches being reengaged at another point in the cycle of turning of the table, means on said spindles for gripping the work pieces, and means for operating the last mentioned means so that the work pieces are released when the spindles are stopped and are gripped shortly after the spindles are restarted.

3. In a machine of the character described, the combination of a lower stator part and an upper rotor part coaxially arranged, a plurality of circumferentially spaced spindles mounted in the rotor and arranged to carry work pieces to be machined, means for driving said spindles whereby to drive the work pieces, means for communicating rotation to the rotor during the driving of the spindles, two sets of tool holders mounted on said rotor for reciprocation vertically and horizontally for operation on the work pieces, a continuous annular cam below said rotor on said stator having followers engaging the same for communicating vertical feed to the one set of tool holders, and another continuous annular cam below the rotor on said stator also having followers engaging the same for communicating horizontal feed to the other set of tool holders whereby both horizontal and vertical feed movements are communicated to the tool holders in the turning of the rotor.

4. In a machine as set forth in claim 3 wherein the spindles are thrown out of operation between two points in the cycle of turning of the rotor at an operator's station for the purpose of permitting the removal and the placing of work pieces on the spindles, and wherein means is provided for discharging cutting fluid onto the work pieces during the turning of the spindles, the provision of a hood on the stator part enclosing the rotor part and the elements carried thereby, the said hood having an opening at the operator's position affording access to the spindles.

5. In a machine as set forth in claim 3 wherein the spindles are thrown out of operation between two points in the cycle of turning of the rotor at an operator's station for the purpose of permitting the removal and the placing of work pieces on the spindles, the provision of a hood on the stator part enclosing the rotor part and the elements carried thereby, the said hood having an opening at the operator's position affording access to the spindles, a cutting fluid distributor turning with the rotor and having delivery openings leading to the several spindles for furnishing cutting fluid onto the work pieces in operation, and valves for controlling the passage of fluid through said openings, said hood having a cam surface on the under side thereof for the operation of the valves whereby to shut off the discharge of cutting fluid when the openings are directed toward the hood opening at the operator's position.

6. A machine of the character described comprising a base, a turntable mounted for rotation on a standard fixed with respect to the base, a plurality of spindles rotatably mounted in bearings in the table, a drive shaft journaled in the base, means providing a driving connection for the table with said shaft whereby to turn the table relative to the base, a driven shaft also having a driving connection with the aforesaid shaft and extending centrally upwardly through said standard to the turntable, a central gear fixed on said driven shaft, gears mounted on the turntable and meshing with the spindle gears and the central gear on the driven shaft whereby to provide a driving connection between all of the spindles and the driven shaft.

7. A machine as set forth in claim 6 including clutch collars splined on the spindles and arranged for detachably connecting the spindle gears with the spindles, and means acting between the base and the turntable arranged to shift the clutch collars to disengage the drives for the spindles in succession at a certain point in the turning of the table.

8. In a machine of the character described, the combination with a base, a turntable mounted thereon for rotation, and a plurality of spindles rotatably mounted in the turntable of a driving shaft journaled in the base, a driving connection between said shaft and all of said spindles for operating the latter in unison, a clutch controlling said spindle driving connection, another driving connection between the turntable and the driving shaft, a second clutch controlling said turntable driving connection, and a pair of distinct means for operating one of said clutches, one of said means comprising a manually operable lever and the other of said means comprising a member connected with the clutch for operating the same, spring means normally tending to move said member in one direction so as to disengage the clutch, a stop preventing the movement of said member, and manually operable means for operating the stop to a retracted position to permit the quick disengagement of the clutch under the action of the spring means.

9. In a machine of the character described, the combination of a base, a turntable mounted for rotation on a vertical axis on a standard on said base, the marginal portion of said turntable overlying a portion of said base projecting into close proximity therewith, a plurality of spindles rotatably mounted in bearings in the table, means for driving the same, means for simultaneously turning the table, a carriage slidably mounted on the marginal portion of said table for substantially horizontal movement, and cam means mounted on the projecting portion of the base beneath the marginal portion of the table having engagement with a part on the carriage for communicating movement to the latter in the turning of the table.

10. In a machine of the character described, the combination of a base, a turntable mounted for rotation on a vertical axis on a standard on said base, one or more spindles rotatably mounted in bearings in said table, means for driving the same, means for simultaneously turning the table, one or more carriages associated with said spindles and mounted on said table for up and down movement, parts for operating said carriages projecting below the table, and cam means carried by an upwardly projecting portion of the base having engagement with said parts whereby movement is communicated to said carriages in the turning of said table.

11. In a machine of the character described, the combination of a base having a vertical standard thereon, a turntable mounted for rotation on said standard, a substantially cylindrical housing on said base substantially concentric with said standard and enclosing the same, said turntable having the marginal portion thereof overlying the top of said housing, rotary work holding spindles mounted in bearings in said table, means for driving the same, means for simultaneously turning the table, tool carriages slidably mounted adjacent the spindles on the marginal portion of said table, cam means on the upper portion of said housing beneath the marginal portion of the table having engagement with parts on the carriages for communicating horizontal movement to said carriages during the turning of the table, other tool carriages slidably mounted in the table adjacent said spindles for vertical movement having parts for operating the same projecting below the table within the housing, and cam means mounted within the housing having engagement with said parts for communicating movement to the carriages during the turning of the table.

12. A machine as set forth in claim 11 including springs normally tending to move the first mentioned carriages to retracted position and serving to hold the parts thereof in cooperative relation with the first mentioned cam means, and other spring means tending normally to move the last mentioned carriages to retracted position and serving to hold the parts thereof in cooperative relation with the last mentioned cam means.

13. In a machine as set forth in claim 11 wherein the spindles are disconnected from their driving means during the travel thereof past an operator's position, a hood covering the turntable and resting on top of the housing, said hood having an opening therein at the operator's position.

14. A machine as set forth in claim 11 including a substantially bell-shaped hood disposed over the turntable with the marginal portion thereof enclosing the marginal portion of the turntable and resting on top of the housing, said hood having an opening therein at an operator's position affording access to the work on the work holding spindles.

15. A machine as set forth in claim 11 including clutch collars splined on the spindles and arranged for detachably connecting the spindles with the driving means therefor, and means acting between the housing on the base and the turntable arranged to shift the clutch collars to disengage the drives for the spindles in succession at a certain point in the turning of the table.

16. A machine as set forth in claim 11 including chucks on the spindles for detachably holding the work pieces, and means acting between the housing on the base and the turntable arranged to open and close the chucks for the spindles in succession at a certain point in the turning of the table.

17. A machine as set forth in claim 6 including chucks on the spindles for detachably holding work pieces and means acting between the base and the turntable arranged to open and close the chucks for the spindles in succession at a certain point in the turning of the table.

18. In a machine as set forth in claim 6 wherein the driven shaft is hollow and serves as a cutting fluid conduit, a cutting fluid pump in the base having communication with a source of cutting fluid supply and communicating with the lower end of said shaft, and a cutting fluid distributor turning with said table having communication with the upper end of said shaft and having delivery openings leading to the various spindles whereby to supply cutting fluid into the work.

19. In a machine as set forth in claim 6 wherein the driven shaft is hollow and serves as a cutting fluid conduit, a cutting fluid pump in the base having communication with a source of cutting fluid supply and communicating with the lower end of said shaft, a cutting fluid distributor turning with said table having communication with the upper end of said shaft and having delivery openings leading to the various spindles whereby to supply cutting fluid onto the work, valves controlling the passage of the fluid through said openings, and cam means in fixed relation with the base for closing said valves at a certain point in the turning of said table.

20. In a machine of the character described, the combination with a base, a turn table mounted for rotation on said base, and a plurality of spindles rotatably mounted on the turn table, of a power shaft, a main drive shaft journaled in the base and arranged to be driven from the power shaft, a main clutch for detachably connecting the power and main drive shafts, a driving connection between the drive shaft and all of the spindles on the turn table made effective upon the engagement of the main clutch, another driving connection between the drive shaft and the turntable, an auxiliary clutch controlling said driving connection and a pair of pick-off gears for each of the two driving connections referred to whereby the drive ratio between the drive shaft and the spindles may be varied independently of the drive ratio between the drive shaft and the turntable or vice versa.

21. In a machine of the character described, the combination with a base, a turntable mounted for rotation on said base and a plurality of spindles rotatably mounted on the turntable, of a main drive shaft journaled in the base, two other power take-off shafts, one having a driving connection with the spindles in the turntable and the other having a driving connection with the turntable, and a pair of pick-off gears for each of said shafts providing driving connections between the same and the main drive shaft whereby the drive ratio between the drive shaft and the spindles may be varied independently of the drive ratio between the drive shaft and the turntable or vice versa.

22. In a machine of the character described, the combination with a base, a turntable mounted for rotation on said base and a plurality of spindles rotatably mounted on the turntable, of a main drive shaft, two power take-off shafts driven from the latter, one having a driving connection with the spindles on the turntable and the other having a driving connection with the turntable, a power shaft, a main clutch for detachably connecting said shaft with the main drive shaft whereby to control the operation of the turntable and spindles, and an auxiliary clutch providing a driving connection between the main drive shaft and the last mentioned power take-off shaft whereby to control the driving of the turntable independently of the spindles.

23. A machine as set forth in claim 22 including two independent means for operating the last mentioned clutch, the one means comprising a hand lever arranged when moved in one direction to engage the clutch, there being spring means normally tending to disengage the clutch, and the other means comprising a trip button having a part connected therewith normally rendering said spring means inoperative, the operation of kicking or otherwise striking said button to move said part serving to permit disengagement of the clutch by the spring means.

24. In a power transmission for machine tools, the combination of a housing, a main drive shaft extending crosswise of said housing and received in bearings in opposite side walls thereof, two power take-off shafts disposed in said housing at opposite ends of said drive shaft and in parallel relation therewith, pick-off gears providing driving connections between each of said take-off shafts and the main drive shaft whereby the drive ratio between either take-off shaft and the main drive shaft may be varied independently, a power shaft, a main clutch providing a driving connection between said shaft and the main drive shaft whereby the driving of the two power take-off shafts is jointly controlled, and an auxiliary clutch providing a driving connection between one of said power take-off shafts and the main drive shaft for independently controlling the driving of said take-off shaft.

25. A power transmission as set forth in claim 24 including two independent means for operating the last mentioned clutch, the one means comprising a hand lever arranged when moved in one direction to engage the clutch, there being spring means normally tending to disengage the clutch, and the other means comprising a trip button having a part connected therewith normally rendering said spring means inoperative, the operation of kicking or otherwise striking said button to move said part serving to permit disengagement of the clutch by the spring means.

In witness of the foregoing I affix my signature.

JAMES J. MORRIS.